Patented Apr. 1, 1952

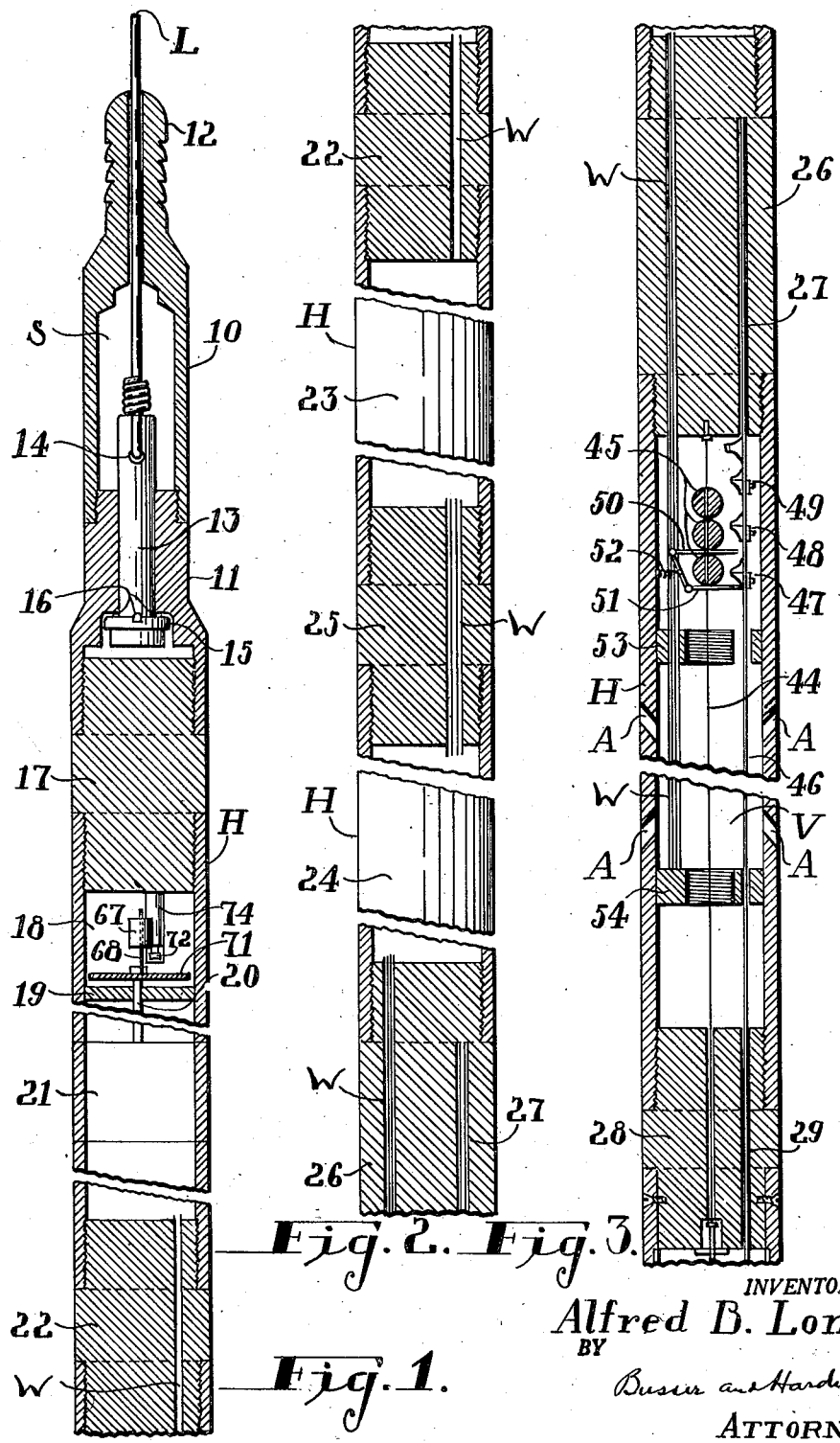

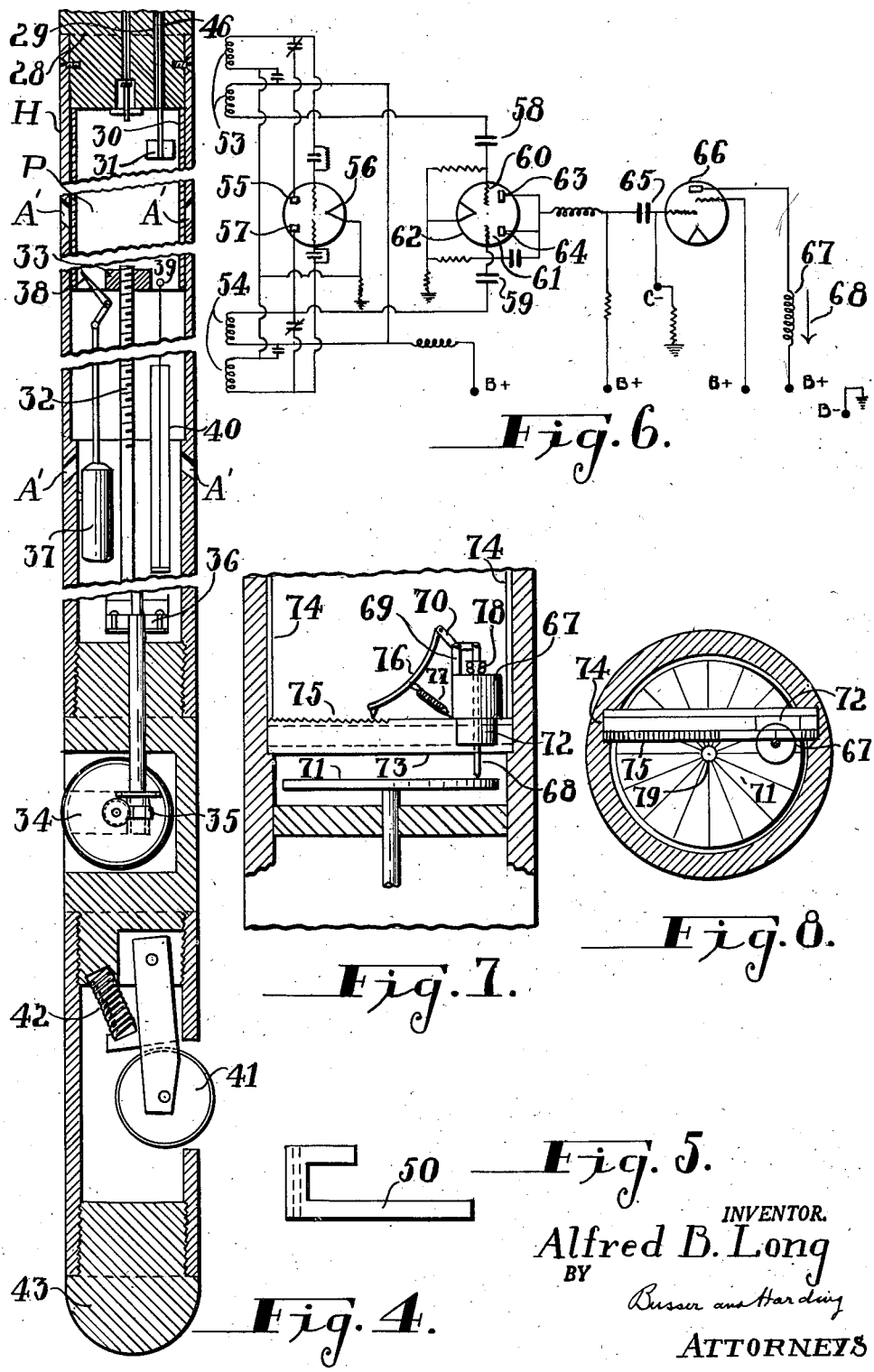

2,590,982

UNITED STATES PATENT OFFICE 2,590,982

WELL LOGGING APPARATUS

Alfred B. Long, Beaumont, Tex., assignor to Sun Oil Company, Philadelphia, Pa., a corporation of New Jersey Application September 20, 1946, Serial No. 698,365

6 Claims. (Cl. 73—151)

This invention relates to apparatus for logging a well and more particularly to apparatus for measuring and recording viscosity of the fluid within a well bore hole and also the fluid pressure and temperature.

In the production of oil and gas wells, it is generally desirable to have information as to the viscosity of the well fluid under conditions actually occurring within the well. The viscosity, temperature and pressure of the well fluid will vary at different depths within the well, and it is desirable to measure and record viscosity under the various conditions ranging from those prevailing at the oil or gas reservoir up to surface conditions. Such information is useful in the calculation of oil and gas reserves, economic rates of production and the like.

Previous methods of measuring the viscosity of well fluids have involved obtaining a sample of the fluid usually in a valve equipped bomb, and thereafter transferring the sample to a laboratory for measurement. In practicing such methods it has been necessary to predetermine the temperature and pressure conditions within the well at the depth at which the information is desired, and then to establish such predetermined pressure and temperature conditions in the laboratory test in order that the resulting viscosity data will be representative of actual well conditions. To obtain full information at various depths within a well according to such prior practice thus has involved a laborious and time consuming porcedure wherein samples of the well fluid are repeatedly subjected to predetermined conditions of temperature and pressure simulating those at various depths in the well and then are tested to determine viscosity.

The principal object of this invention is to provide apparatus for measuring and recording the viscosity of a well fluid while the well fluid is within the well bore hole, and thus to avoid the necessity of sampling the fluid and bringing it to the surface to have its viscosity measured under controlled conditions of temperature and pressure simulating those conditions prevailing within the well at the point or well depth from which the sample was obtained.

It is also an important object of this invention to provide apparatus for simultaneously or substantially simultaneously measuring the temperature, pressure and viscosity of a fluid within a well bore hole.

It is a further object of the invention to provide apparatus for measuring and recording the temperature, pressure and viscosity of a fluid encountered at any desired measuring point or well depth within a well bore hole. Flexibility of the mechanism enables operation of the device while the bomb instrument is ascending or descending in the well hole. To obtain deep well readings the bomb instrument can be lowered to the greatest depth for which readings are required and operated while it ascends. For readings close to the surface the operation may be reversed and readings taken as the instrument descends in the well hole.

Further objects and advantages will be apparent by reference to the following specification and drawings in which:

Figs. 1, 2, 3 and 4 are respectively longitudinal section views which taken together show the complete measuring and recording device.

Fig. 5 is a plan view of an element shown in Fig. 3.

Fig. 6 is a schematic wiring diagram of the electronic oscillating circuit used in the viscosity measuring apparatus of the instrument bomb.

Figs. 7 and 8 are detailed views of the stylus actuating mechanism for recording fluid viscosities.

The oil and gas well recording viscosimeter device of this invention is comprised generally of an elongate cylindrical body member H described herein as the instrument bomb or simply bomb, which, for purposes of discussion, can be divided roughly into four parts. The upper section which is shown in Fig. 1 contains provisions for attaching a line of small diameter for lowering and raising the assembly in the well tubing. Beneath the line attaching device, a mechanism for recording the viscosity of the well fluid is housed in a sealed chamber. The second section of the bomb housing includes a battery compartment and the electronic circuit components which operate the stylus for marking the viscosity record chart. The third section of the cylindrical member encloses a device which is directly affected by the fluids within the well and cooperates with the mechanism for recording viscosities in the upper sections. The lower section houses measuring devices and the chart mechanism by which the fluctuations in temperature and pressure are recorded. As the assembly is raised or lowered in the well tubing, friction wheels mounted in this lower section engage the inner walls of the well tubing rotating the recording chart and moving it past the fixed positions of the pens or styluses for recording temperature and pressure.

Referring to Figure 1 a swivel connection indicated generally at S is constructed of upper and lower cooperating sleeves 10 and 11 which are threaded together as a unit and also threadably secured at the upper end of the main housing of the instrument bomb H. The swivel connection is adapted to receive a measuring line by means of which the bomb is dropped into the well tubing and the connection is so designed as to prevent the measuring line from becoming twisted during the dropping or recording operation. The upper sleeve 10 terminates in a cap portion 12 which is drilled axially for the reception of a suitable measuring line L. The lower sleeve 11 is also drilled axially to receive a stub shaft 13 having an aperture 14 adjacent its upper end for securing the measuring line thereto. At its lower end the stub shaft is flanged outwardly at 15 and the sleeve 11 is recessed to retain roller bearings 16 which are received by the flanged lower end of the stub shaft. The above described swivel device is no part of the present invention as this element is readily available on the market but is described as showing one auxiliary element having utility with the device of the present invention.

Lower sleeve 11 is threadably connected to the housing of bomb H by coupling 17 which forms the upper bulkhead of the viscosimeter recording chamber 18. Bulkhead 19, forming the lower divider of chamber 18, is axially drilled to receive shaft 20 which rotates chart disc 71 by means of a clock-work mechanism of conventional design (not shown), which is mounted immediately below chamber 18 within the bomb H in space 21. The stylus operating mechanism will be fully described later in connection with Figs. 6 and 7. Coupling 22 forms a bulkhead, sealing the lower part of the clock-work mechanism chamber and threadably engages the next section of the instrument bomb housing.

The second section shown in Fig. 2 is divided into two sealed chambers 23 and 24 which contain batteries as the electrical power source and the electronic circuit components respectively. Battery section 23 is coupled to the section above, discussed as Fig. 1 by threadably engaging coupling 22 which forms a bulkhead at the top of this section. Coupling 25 threadably engages the cylindrical housing between the battery section 23 and the electronic circuit section 24 forming the lower and upper bulkheads of these chambers. This section of the bomb housing H is connected to section 3 next below by coupling 26 which forms the lower bulkhead of the electronic circuit components chamber 24. Couplings 22, 25 and 26 are drilled to permit the passage of conductors W therethrough so as to connect the electrical devices later described.

Referring to Fig. 3, coupling 26 threadably attaches this section of the bomb housing H to the second section (Fig. 2) above it, and forms the upper support for a fine wire 44 which guides beads 45 of steel or other material of desirable magnetic characteristics through coils 53 and 54. An aperture 27 is drilled in coupling 26 to position trip rod 46 in operating engagement with the toggle release permitting beads 45 to be released at predetermined intervals. The toggle release mechanism illustrated, is one form which may be used, and comprises a plurality of spaced teeth 47, 48 and 49 fixed to trip rod 46 which engage the bead release plates 50 and 51. Spring 52 is urged beyond its center where it carries the bead release plate the remaining distance, allowing one bead of the plurality of beads 45 to fall and retains the remaining beads in position to be dropped later. A detail of one of the identical bead release plates 50 and 51 is sketched in Fig. 5 where the prong or finger device adapted for this operation is clearly shown. Returning to Fig. 3, a plurality of apertures A permit the well fluids to enter the viscosity measuring chamber V entirely surrounding the coils 53 and 54 and the bead dropping mechanism described above. Coupling 28 threadably connects this section with the next lower section and anchors the fine wire 44 insuring the passage of the beads 45 through coils 53 and 54. Aperture 29 drilled through coupling 28 permits trip rod 46 free vertical movement within the viscosity measuring chamber V.

The lower section shown in Fig. 4 includes the temperature and pressure measuring and recording instruments in chamber P at the upper end. This section is joined to the section above by coupling 28 and held in place by countersunk screws. Chart holder 30, which is connected to trip rod 46 by a fastening device 31 at its upper end, is moved downward within chamber P by the rotation of screw threaded shaft 32 in engagement with a threaded cooperating member 33. Shaft 32 is rotated at a predetermined speed by chart drive wheel 34 which frictionally engages the side of the well tubing and transmits the motion through gear wheels generally shown at 35. A ratchet device 36 is inserted in the driving mechanism to prevent damage to chart holder 30 and screw threaded shaft 32 when the chart reaches the end of the allowed travel distance. The Bourdon tube 37 transmits the effects of pressure of the fluids in the well to the chart and records the variations by means of stylus 38 actuated by the lever arms as shown. The temperature of the well fluids is measured and recorded by means of stylus 39 attached to a bimetallic strip 40. The chamber P is flooded with the well fluids which are admitted through apertures A' thus permitting contact with the temperature and pressure measuring instruments. The recording surface of the temperature and pressure recording chart (not shown) may be a brass sheet coated with layout ink or other suitable coating material which may be scratched by the recording stylus points to produce the record lines. The coating material should be insoluble both in oil and in water so as to provide a surface which will be unaffected by the fluids encountered in the well. A spring pressed idler wheel 41 is constantly urged outwardly by spring 42 against the inside of the well tubing thereby forcing the housing body against the diametrically opposite wall insuring the friction contact of chart drive wheel 34 and the consequent operation of the chart and bead dropping mechanism. Rounded cap 43 is threaded into the bottom of the housing to lend rigidity to the structure and to protect the mechanism above as the viscosimeter descends into a well.

The electrical circuit used in measuring the viscosity is located in chamber 24 (Fig. 2) and is shown in detail in Fig. 6. The coils 53 and 54 shown in the viscosity measuring chamber V (Fig. 3) are respectively connected in a pair of Hartley oscillator circuits. The oscillator circuit of coil 53 includes the triode section 55 of tube 56 and the circuit of coil 54 includes the triode section 57. The outputs of the respective oscillator coils 53 and 54 are coupled by condensers 58 and 59 to the control grids of a pair of amplifier triode sections 60 and 61 of tube 62. The plates 63 and 64 of both triode sections 60 and 61 are connected together so that the amplified output signals from both oscillator coils 53 and 54 are combined together at this point. The combined signal voltage is then coupled by condenser 65 to the control grid of a power amplifier tube 66. In series with the plate current of tube 66, which varies with the variations of the signal voltage on its control grid as originally supplied by the oscillator circuits of coils 53 and 54, is the operating relay 67 of a recording pen 68. It should be understood that other known types of tubes or oscillating circuits may be used, those chosen in Fig. 6 of the drawings being considered as illustrative only. The power source for supplying the plate voltages and filament voltages for the tube circuits is contained in the battery section chamber 23 shown in Fig. 2.

One form of viscosity recording device is shown located in the upper part of the cylindrical housing in Figure 1. Details of this device are shown in Figures 7 and 8 to which reference is now made. The operating relay 67 is a part of the electrical circuit already described (Fig. 6) and operates stylus 68 centrally positioned in the relay by bracket 69 and bell crank arm 70. Chart disc 71, rotated beneath the stylus 68 by a conventional clock work mechanism, receives the stylus marks which indicate fluid viscosities as fully described later in discussing the operation of the instrument bomb. Operating relay 67 is mounted on a slidable block 72 freely movable on cross piece 73 which supports it. Cross piece 73 and the mechanism mounted thereon is secured in position by slots 74 in the bomb housing from which it is slidably removable. Toothed rack 75 is formed as part of cross piece 73 and is engaged by pawl 76 as a means for moving stylus 68 toward the center of the chart. The operation of pawl 76 is facilitated by springs 77 and 78 located as shown. A chart of conventional type is fastened to chart disc 71 by thumb nut 79 or may be secured by other means such as clamps or glue.

It is believed the operation of the device will be understood from the above description of the several parts, however, to further clarify the invention a method of operation is now given.

The cylindrical housing is lowered into a well bore hole with the above described instruments for measuring temperature, pressure and viscosity set to mark the records on the charts provided. The fluid in the well is admitted freely into the lower two sections of the instrument bomb through apertures A and A' (Figs. 3 and 4) where it contacts the measuring instruments as the bomb is raised or lowered within the bore hole. Figure 4 shows the chart holder 30 set at the extreme upward limit of travel within the bomb so that operation of the device will move the chart downward. It can readily be seen that the chart holder 30 can start from the lower limit of the chart chamber P and move upwardly thus permitting the instrument to operate either as it is raised or lowered.

Again referring to Fig. 4, as the cylinder is raised or lowered the spring pressed idler wheel 41 engages the well bore hole interior wall and through its spring action causes the chart drive wheel 34 to frictionally contact the opposite bore hole interior wall and be rotated as the cylinder raises or lowers in the well. Screw threaded shaft 32 is rotated through gear chain 35 and ratchet 36 by the rotation of chart drive wheel 34 causing chart holder 30 and its attached chart (not shown) to move axially. The stylus points 38 and 39 of the Bourdon tube 37 and the bimetallic strip 40 respectively being fixed within the chamber P, scribe variations in temperature and pressure as the chart holder 30 moves. The viscosity measuring and recording instrument is coordinated with the axial movement of the temperature and pressure chart through connection 31 which fastens trip rod 46 to the chart holder 30.

The axial movement transferred to trip rod 46 is transmitted to viscosity measuring chamber V in Fig. 3 where a plurality of teeth 47, 48 and 49, etc., are shown in relation to the toggle bead release which they operate. A magnetic bead 45 is held in position, ready to drop along a fine wire 44, by the lower plate 51 of the toggle mechanism while upper plate 50 holds the remaining beads in place. This enables the mechanism to drop one bead at a time at predetermined intervals. Plates 50 and 51 are designed with two prongs or fingers (Fig. 5) with the long one acting as the contact with teeth 47, 48, 49, etc., while the short prong is designed to release the magnetic beads 45 with the minimum of movement required for operation. Toggle spring 52 carries the release plate back sufficiently to permit a magnetic bead to drop, after the teeth on the trip rod have pushed the release plate inward until the spring is past its center. As the magnetic beads 45 are released, one at a time, they drop through the well fluid and down the fine wire 44 passing through the oscillator induction coils 53 and 54. Since the coils 53 and 54 are spaced a known distance apart and the speed of movement for the magnetic beads 45 as they drop down the wire 44 is proportional to the viscosity of the fluid within the bomb housing H, the time lapse between the excitation of coils 53 and 54 will be proportional to the fluid viscosity. The electrical disturbance in the coils is passed to the electronic circuit described in Fig. 6 and operates stylus 68 marking the viscosity recording chart.

It will be apparent that the bead trip mechanism described above is given only as an example. Many modifications of this device are possible. For example, the trip rod could be detached from the pressure-temperature chart holder and operated electrically as by a solenoid or by a clockwork mechanism. A further modification would be to eliminate the trip rod entirely, and actuate the bead release plates of the toggle mechanism by a clock-work mechanism or magnetic coils. Many changes could thus be made in the operating mechanism yet be within the scope of the invention.

The electric impulses which actuate the viscosity marking stylus passes along wires W from the coils to the electronic circuit and thence to the recording mechanism shown in Fig. 1, and as detailed in Figs. 7 and 8. Reference is made to these three figures for a complete understanding of the device in operation. The operating relay 67 receiving the pulse from the electronic circuit (Fig. 6) causes marking stylus 68 to move downwardly marking the chart (not shown) on chart disc 71 which is rotated by a clock-work mechanism. The initial setting of the stylus 68 is near the outer periphery of the chart. The downward movement of the stylus compresses spring 78, rotates bell crank lever 70 through a small arc and, by pulling on pawl 76, moves the relay 67 and stylus 68 fastened to sliding block 72 a short distance toward the center of the chart. Spring 77 prevents pawl 76 from disengaging the teeth on rack 75 but is of necessity of lighter construction than spring 78 which on expansion with the release of stylus 68 does not restrict the movement of pawl 76 to the next tooth in preparation for the next impulse and consequent movement toward the center of the chart. The marks on the chart will consequently form a spiral closing on the center of the disc permitting readings over long distances which would otherwise be limited to the proportional depth as indicated by the greatest circumference of the chart. In this manner no two readings will be on the same circumference making the chart easy to read and presenting an accurate record.

With the instrument as described above, a new method of well logging by substantially simultaneously measuring and recording the pressure, temperature and viscosity of fluid within a well bore hole is made available. An apparatus for measuring fluid viscosity at any point within a well bore hole under conditions of temperature and pressure encountered therein is provided by this invention. It should be noted that the viscosity measuring apparatus of this invention makes it possible to measure and record the viscosity of a fluid within a well bore hole while the fluid is in the well and under well conditions of temperature and pressure, a method heretofore considered impossible.

I claim:

1. A device for concurrently measuring and recording temperature, pressure and viscosity of well borehole liquids in situ comprising, in combination: a bomb apertured to admit well liquids and adapted to be raised and lowered in the tubing in a borehole; a longitudinally movable chart within said bomb; means to actuate said chart during the movement of said bomb; a pressure measuring instrument in said bomb arranged to record pressure variations on said chart; a liquid temperature measuring instrument in said bomb constructed to record temperature variations on said chart; and means adapted to be actuated by the movement of said chart to measure and record borehole liquid viscosities concurrently with the temperature and pressure recordings including a plurality of beads of magnetic material within said bomb arranged to drop through the well borehole liquid therein, a bead release arranged to selectively drop one bead at a time, an activator for said bead release operated at controlled intervals by the movement of said chart, spaced electric fields along the path of the dropping beads, and recording means electrically coupled to said spaced fields responsive to the passage of the beads therethrough.

2. A device for concurrently measuring and recording temperature, pressure and viscosity of well borehole liquids in situ comprising, in combination: a bomb to enclose measuring instruments, apertured to admit well liquids to said measuring instruments and adapted to be raised and lowered in the tubing in a borehole; a longitudinally movable chart within said bomb; means to actuate said chart during the movement of said bomb; a liquid pressure measuring instrument in said bomb arranged to record pressure variations on said chart; a liquid temperature measuring instrument in said bomb constructed to record temperature variations on said chart; and a viscosity measuring instrument within said bomb actuated by the movement of said longitudinally movable chart including a pair of electrical coils vertically spaced apart, each of said coils being connected in separate oscillating circuits, a plurality of metallic beads positioned above and in alignment with said coils, means actuated by the movement of said vertical chart to selectively drop one bead at a time at controlled intervals through the liquid whose viscosity is to be measured and through each of said coils in succession, and further means to record the electrical disturbance of the oscillating circuits as the beads of magnetic material pass through each coil, the elapsed time for the passage of said beads between said coils being indicative of the liquid viscosity.

3. A device as defined in claim 2 wherein the viscosity recording means within said bomb is further characterized by a relay electrically connected to said oscillating circuits and responsive to the passage of the metallic beads through said coils, a stylus positioned in operating engagement with said relay, a spring retained pawl linked to said stylus and activated thereby, a rack slidably supporting said relay and arranged to receive said pawl, and a rotatable chart horizontally positioned below the rack to receive the marks of said stylus.

4. A device for concurrently measuring and recording temperature, pressure and viscosity of well borehole liquids in situ comprising in combination: a bomb to enclose measuring instruments, apertured to admit well liquids to said measuring instruments and adapted to be raised and lowered in the well tubing of a borehole; a movable chart within said bomb; means to actuate said chart at predetermined levels during the movement of said bomb including a wheel within said bomb positioned to frictionally engage the wall of the well tubing, and a shaft geared to said wheel threadably connected to said chart; a Bourdon tube within said bomb to measure pressure, a stylus cooperating with the chart and linked to said tube to record pressures; a bimetallic strip within said bomb to measure temperatures and arranged to record said temperature measurements on the chart; a liquid viscosity measuring and recording instrument in said bomb adapted to be actuated by the movement of said chart comprising a pair of electrical coils vertically spaced apart, each of said coils connected in separate oscillating circuits, a plurality of beads of magnetic material positioned within said housing above said coils and aligned therewith, a wire centrally positioned within said vertical electrical coils on which the metallic beads are arranged to slide, a spring retained toggle to permit said metallic beads to drop through the well liquid and successively through said vertical coils, a trip rod connecting said chart to the spring retained toggle whereby the movement of the chart releases the metallic beads, an electrically operated stylus actuated by the electrical oscillations of said circuits on the passage of the metallic beads through said coils, and a second chart within said bomb cooperating with said stylus for the recording of measured viscosities.

5. A device for concurrently measuring and recording temperature, pressure and viscosity of well borehole liquids in situ comprising, in combination: a bomb apertured to admit well liquids and adapted to be raised and lowered in a borehole; marking means responsive to liquid temperature and pressure variations in said bomb; a chart movable longitudinally in said bomb, positioned to cooperate with said temperature and pressure marking means; means to actuate said chart during the movement of said bomb in proportion to the movement in the borehole; means in said bomb to measure the viscosity of the borehole liquids including a plurality of magnetic beads, a pair of spaced electrically excited coils, and a guide to direct said beads through the coils; a bead release interposed between said beads and the coils; means cooperating with said chart to activate said bead release at controlled intervals; a stylus electrically coupled with said coils; and a second chart cooperating with said stylus to record the viscosity measurements.

6. A device for concurrently measuring and recording temperature, pressure and viscosity of well borehole liquids in situ comprising, in combination: a bomb apertured to admit well liquids and adapted to be raised and lowered in a borehole; marking means to record liquid temperature and pressure measurements in said bomb; a chart, movable axially in said bomb, positioned to cooperate with said temperature and pressure marking means; a friction drive wheel on said housing extended to engage the borehole; a gear train cooperating with said drive wheel in operating engagement with said chart; means to measure viscosity of the borehole liquids including a plurality of magnetic beads, a pair of spaced electrically excited coils, and a wire positioned centrally of said coils to slidably guide said heads therethrough; a bead release interposed between said beads and the coils; a trip rod operably connecting said bead release with the axially movable chart; a stylus electrically coupled with said coils; and a second chart cooperating with said stylus to record the viscosity measurements.

ALFRED B. LONG.

REFERENCES CITED

The following references are of record in the file of this patent:

UNITED STATES PATENTS

| Number | Name | Date |
|---|---|---|
| 1,780,952 | Symmes | Nov. 11, 1930 |
| 2,015,851 | Herrick et al. | Oct. 1, 1935 |
| 2,252,572 | Lang | Aug. 12, 1941 |
| 2,320,218 | Buckley | May 25, 1943 |
| 2,388,387 | Cohen | Nov. 6, 1945 |